INVENTOR.
Marc A. Corti
BY
Nolte and Nolte
ATTORNEYS

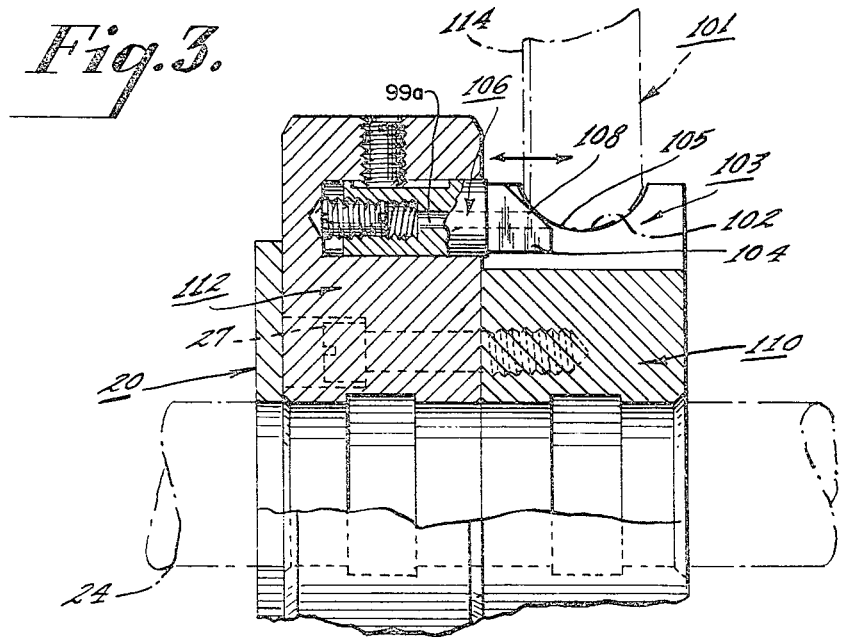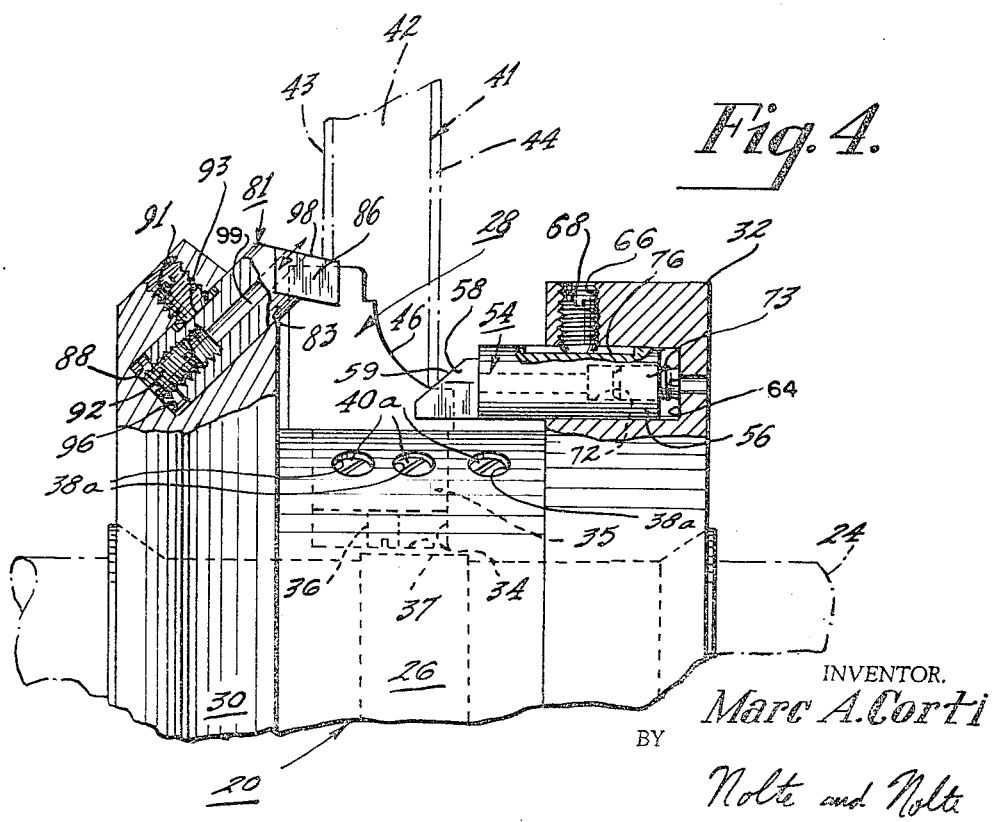

United States Patent Office 3,490,118
Patented Jan. 20, 1970

3,490,118
ROTATABLE CUTTERHEAD HAVING
ADJUSTABLE CUTTING TOOLS
Marc A. Corti, Darien, Conn., assignor to Marcoloy, Inc.,
Springdale, Conn., a corporation of Connecticut
Filed Mar. 1, 1967, Ser. No. 619,841
Int. Cl. B26d 1/12
U.S. Cl. 29—105                     18 Claims

ABSTRACT OF THE DISCLOSURE

A rotatable cutter head is disclosed for performing a cutting operation on a composite piece of work, wherein means are provided for cutting the component parts of the composite work piece and for radially and axially adjusting these means so as to more efficiently perform the cutting operation on the composite work piece.

---

The present invention relates to rotatable material forming tools, and more particularly to a tool having several sets of circularly arranged cutting tools or knives, each tool of each set being detachably received by individually adjustable means thereby to facilitate tool selection suitable to form different portions of a work piece simultaneously.

Parts of modern laminated furniture, for example the tops of chests and the like and laminated table tops, are constructed of a lamina of relatively soft workable material, such as wood, covered on either or both sides with a bonded lamina of harder, and in some cases, more brittle material. Usually each harder lamina is relatively thin with respect to the thickness of the softer lamina. The edges of these laminates are finished with an ornamental contour pattern. However, the pattern appears principally on the edge of the softer lamina.

An object of the present invention is to provide a novel rotatable tool having cutting means presenting a pattern outline for generating a pattern on a surface of laminated work pieces which can be serviced and readjusted readily without changing the original pattern outline.

Another object of the invention is to provide a novel rotatable material forming tool having a plurality of sets of circularly arranged cutting knives or bits presenting a peripheral cutting pattern in outline.

A further object of the invention is to provide a novel rotatable material forming tool equipped with a set of circularly arranged adjustable pattern knives and at least one set of auxiliary bits having durable cutting properties, the sets being axially spaced to present a continuous cutting pattern.

A rotatable material forming tool embodying the invention has pattern knives to cut the softer material only so that the pattern outline is preserved and the necessity for frequent sharpening which may result in loss of control of the pattern form is eliminated. The auxiliary bits can be readily readjusted in position along the line of the pattern after removal for sharpening.

The invention is illustrated by way of example in the accompanying drawing which forms part of the application and in which:

FIGURE 3 is a fragmentary sectional view of a slightly modified cutting tool having parts similar to those of the tool of FIGURE 1 but of different physical proportions, the section being taken on a plane parallel to the axis of the tool as indicated by line 3—3 of FIGURE 2; and FIGURE 4 is a sectional view similar to FIGURE 3 of another modification.

Figure 1:
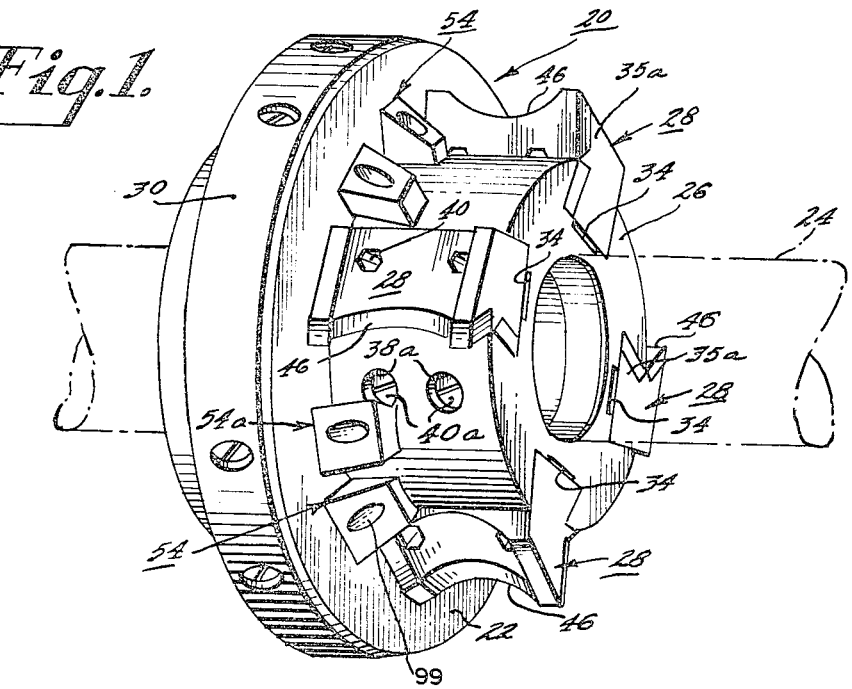
FIGURE 1 is a perspective view of one embodiment of a cutting tool according to the invention.
Figure 2:
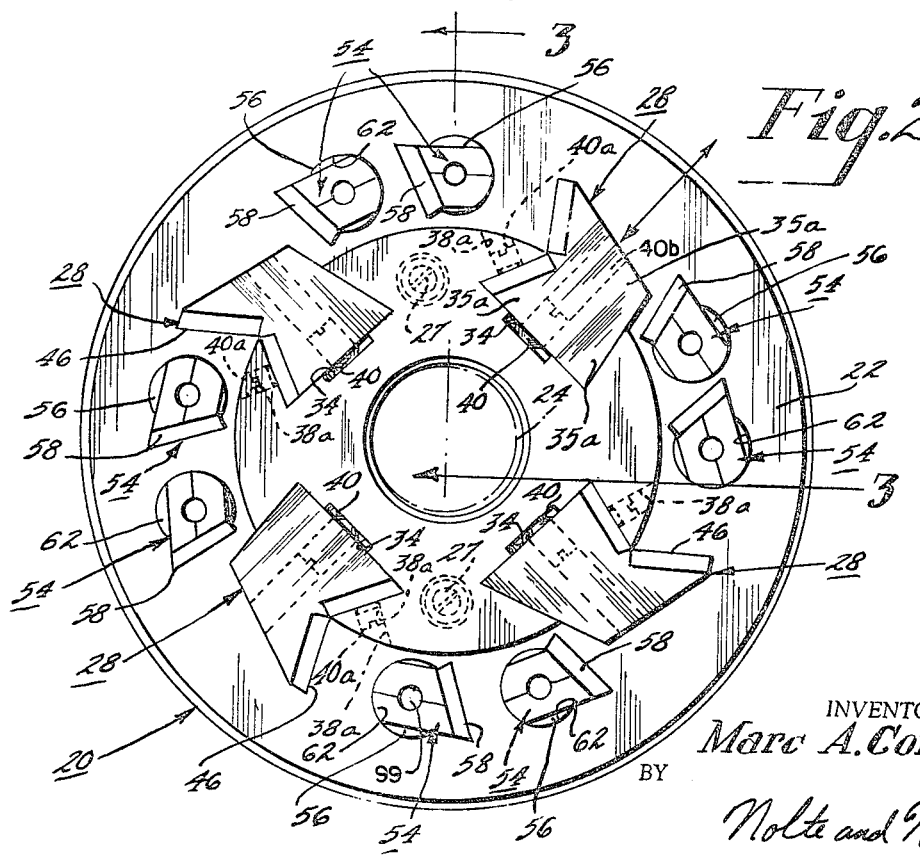
FIGURE 2 is an end view of the tool of FIGURE 1.

Referring to the drawing, and for the present to FIGURES 1 and 2, it will be seen that the cutter head 20 includes a cutter body 22 which, in the illustrative example, is cylindrical in cross section. The cylindrical cutter body 22 has an axial bore to receive an arbor 24, for example, and the cutter head is mounted on the arbor in any known manner to rotate the cutter head to perform desired cutting operations.

In the illustrative example of FIGURES 1 and 2 the cutter body comprises a cylindrical part 26 to which pattern knives 28 are adjustably secured for performing an edge contour cutting operation on the softer lamina of a work piece. The cutter body also comprises a cylindrical part 30 of larger diameter than the part 26. Referring briefly to FIGURE 4, the cutter body includes an additional cylindrical part 32 of larger diameter than the part 26. The structure of FIGURE 4 will be described in more detail later.

The coaxial parts 26, 30 and 32 may be integral and machined from a single piece of stock to their respective desired outside diameters. However, each of these parts may be turned from a separate piece of stock machined to provide outside radial faces so that they may be secured together in any suitable manner and mounted on an arbor to facilitate cutting work pieces of different shapes. The securing means may be the machine screws 27 indicated in FIGURES 2 and 3. A series of sets of each part may be made up, each one of a set having a different diameter from the others so that a selection may be made from each set for assembly into a cutter head 20. This also provides combinations of cutter direction adjustments.

The part 26 (FIGURES 1 and 2) is formed with a plurality of recesses 34 and four pattern knives 28 are shown at 90° intervals. Each recess 34 receives the base portion 35a of a pattern knife 28. Each base portion 35a terminates in an adjustable set screw 36 which engages the bottom of the recess 34 in which it is received. In FIGURES 1 and 2, the pattern knives are adjustable axially by loosening set screws 40a threaded into tapped holes 38a. The pattern knives 28 are also adjustable radially by turning set screw 40 through axial passage 40b.

Cutting the harder lamina of a work piece in manner to accurately continue the pattern outline is accomplished by a plurality of cutting tools or bits 54 having cylindrical shanks 56 and tips or blades 58. The shanks are received in circular recesses 62 in the part 30 of FIGURE 2. The bits 54 are located on a circle of larger diameter than that of the part 26 and are shown as being spaced in groups of two at approximately 15° intervals. None is located opposite a pattern knife 28. Other arrangements to suit any desired cutting operation may, of course, be made within the scope of the invention.

The shanks 56 may be of any suitable metal such as steel and the cutting tips 58 are made of any known hard cutting material such as tool steel or tungsten carbide and are fixed rigidly in any suitable manner known in the art to the shanks 56.

The general structure of one embodiment of a cutter head of this invention is shown in FIGURES 1 and 2 of the drawings as described above. FIGURE 2 shows one circumferential arrangement and angular spacing of the pattern knives 28 and bits 54 as applied to a two part cutter.

Referring to FIGURE 4 showing a modified cutter head 20 having a third cutter part 32 in addition to parts 26 and 30 assembled as shown by way of example in FIGURES 1 and 2: To show versatility of arrangement of the parts 26 and 30 and the additional part 32 the cutter head 20 of FIGURE 4 is shown as being arranged to cut a work piece 41.

In the example of FIGURE 4 the work piece 41, which may be a laminated table top, has a principal lamina 42 of wood, for example, and harder plastic lamina 43 and 44. The latter is usually melamine (melamine formaldehyde resin) or a phenolic resin. In the example of FIGURE 4 the work piece has an edge pattern somewhat like a cornice with an arcuate configuration near each edge. The cutting edge 46 of the pattern knives 28 conform to the outline on a radial plane of the edge of the finished article. The pattern knife adjustment, to be described in detail, permits all of the cutting edges 46 to be set at the same radial distance from the axis of the arbor 24.

The pattern knives 28 in FIGURE 4 in addition to having an outline suitable for cutting the work piece 41, shown only by way of example, have a base or shank 35 of substantially uniform cross section throughout its length which permits radial adjustment with respect to the tool axis. This shank may be rectangular in cross section to prevent rotation and is received in an axially elongated slot 34 rectangular in outline on a plane normal to the axis of the cutter head. Set screws 40a are received in the threaded holes 38a to clamp the pattern knives 28 in their position of radial and axial adjustment.

The cutting tips 58 of the bits 54, now to be described more in detail with present reference to FIGURE 4, have inclined cutting edges 59. Circular recesses 62, indicated above as appearing in the general showing of a cutting tool embodying the invention, are formed in the tool part 32 and terminate in closed ends 64.

The part 32 is also formed with a plurality of threaded bores 66 which communicate with the recesses 62. A set screw 68 is threaded into each bore 66 and engages a flat or keyway 76 on the shank 56.

The shanks 56 have threaded bores 72 at their inner ends which receive set screws 73 which engage the inner ends 64 of the recesses 62. This engagement determines the cutting position of the tips 58. In FIGURE 4 of the drawing, the shanks are movable axially of the part 32 to provide adjustment.

Cutting of the lamina 43, or similar lamina, is accomplished by a second set of bits 81 circularly arranged around the part 30. Each bit has a shank 83 and a cutting tip 86. The shank of each bit is received in a recess 88 and adjustment is provided, as before, by set screws 91 and 82. The set screw 91 engages a flat 93 in the shank 83. The set screw 92 engages the bottom 96 of the recess 88. The bits 81 are movable along a line at an angle to the axis of the part 30. The cutting bits 81 have their shanks 83 formed with axial bores 99 passing all the way through the shanks from their outer end faces. The outer ends of set screws 92 are adapted to receive the end of a tool such as an Allen wrench which may be placed into the bore 99 from the exterior of the cutting bit 81 to adjust the cutting tool along with adjustment of set screws 91, without removing the cutting tool from recess 88. The cutting edges 98 of the tips 86 are inclined as shown to complete the edge pattern as well as to cut the lamina 43.

FIGURE 3 of the drawing, showing a two part cutter head substantially identical with the cutter head of FIGURES 1 and 2 illustrates clearly an important feature of the present invention. The work piece 101, shown by way of example, has an arcuate ornamental edge 102. The pattern knife 103 has a conforming edge 105. The cutting tip 104 of the bit 106 has an inclined cutting edge 108. In the illustrative example the angle of inclination is approximately 45°. The position of the edge with respect to the direction of adjustment of the bit 106 and its center line, and also, the angle of inclination can be varied throughout a wide range within the scope of the invention. The pattern knife 103 is adjustable axially of the part 110 and the bit 106 is adjustable axially of the part 112. The axial adjustment of the cutting tool 106 is performed through axial passage 99a in a manner similar as described supra, in connection with the axial adjustment of cutting tool 81 of FIG. 4. In this way the cutting edge 105 and the edge 108 can be adjusted to selected point of tangency at the location of the lamina 114 presented to the cutter head 20 by a workpiece holder (not shown). This adjustment can be used to compensate wear and regrinding of the pattern knives. A more versatile adjustment arrangement is afforded by the pattern knife shank 35 and holder 34 of FIGURE 4 in conjunction with the bit edge 58. In this example the pattern knife is adjustable radial with respect to the axis of the cutting tool as well as axially. The pattern knife then could have a cutting edge pattern of arcuate shape or have an arcuate portion adjacent the bit edge 58. In the example of FIGURE 4 the bit edge bevels the lamina 44.

While several specific embodiments of the invention have been shown and described in detail to illustrate the application of the inventive principles, it should be understood that the invention may be embodied otherwise without departing from such principles.

What is claimed is:

1. A cutter head comprising a cutter body having axially located means for receiving a driving arbor, said body having a peripheral exterior surface and formed with a plurality of recesses extending into said body from the exterior surface, a plurality of cutting tools each having a part received in a respective recess and having a cutting edge corresponding to the desired contour of a work piece spaced from said last named part, means associated with each recess to provide radial and axial adjustment of the tool part received therein, a second plurality of recesses extending into said body from the exterior surface, a second plurality of cutting tools each having a part received in a respective recess of said second plurality of recesses the cutting edges of said second plurality of cutting tools being positioned relative to said contour cutting edges to cut a portion of said work piece adjacent said contour cut, means associated with each one of said second recesses to provide for adjustment of the tool part received therein in a predetermined direction.

2. A cutterhead as claimed in claim 1, wherein said cutter body comprises a first axial section for said one and a different axial section for said second plurality of recesses.

3. A cutter head comprising a cutter body having axially located means for receiving a driving arbor, said body having a peripheral exterior surface and formed with a plurality of recesses extending into said body from the exterior surface, a plurality of cutting tools each having a part received in a respective recess and having a cutting edge corresponding to the desired contour of a work piece spaced from said last named part, means associated with each recess to provide for radial and axial adjustment of the tool part received therein, said body having a second peripheral exterior surface axially spaced from said first surface and formed with a second plurality of recesses extending into said body from the exterior surface, a second plurality of cutting tools each having a part received in a respective recess of said second plurality of recesses and means associated with each one of said second recesses to provide for adjustment in a predetermined direction of the tool part received therein, said body having a third peripheral exterior surface located axially between said first and second peripheral surfaces and formed with a third plurality of recesses extending into said body from said third exterior surface, a third plurality of cutting tools each having a part received in a respective recess of said third plurality of recesses and having a cutting edge corresponding to the desired contour of a work piece spaced from said last named part, and means individually associated with each of said third recesses to provide radial and axial components of adjustment of the tool part received therein.

4. A cutterhead as claimed in claim 3, wherein said recesses extend into said cutter body and terminate in inner shoulder portion distant from the exterior surface of said cutter body, said first, second and third cutting tools having shank portions disposed each in an associated recess and cutting tips situated beyond said exterior surface of said cutter body, each of said tools terminating in inner ends distant from said cutting tips and directed toward the shoulder portion of the associated one of said recesses, set screw means for each of said tools threadedly connected to the inner end of the associated tool and engaging the shoulder portion of the associated recess, so that said set screw means may be turned for adjusting the extent to which said cutting tips of said tools project beyond said exterior surface, and releasable fixing means carried by said cutter body and engaging said tools for releasably fixing the latter in adjusted positions in said recesses.

5. A cutterhead as claimed in claim 4, wherein an axial bore extends through said tools, at least a portion of said bores being threaded for receiving said set screw means, said set screw means having an end portion adapted to be engaged by an adjusting tool and being accessible through said axial bore from the cutting tip end of said tool.

6. A cutterhead as claimed in claim 5, wherein the recesses associated with at least one of said first, second and third cutting tools are accessible by said adjusting tool from the end thereof containing said shoulder portion for adjusting said set screw means.

7. A cutter head according to claim 1, wherein said means associated with each of said second recesses provides adjustment of each of said second plurality of cutting tools along a line describing an angle with respect to the axis of rotation of said cutterhead.

8. A cutter head according to claim 1, wherein said means associated with each of said second recesses provides adjustment of each of said second plurality of cutting tools along a line parallel to the axis of rotation of said cutterhead.

9. A cutter head as defined in claim 1, wherein said first and said second plurality of recesses extend respectively into said body from the exterior surface of first and second axially spaced peripheral surfaces.

10. A cutterhead as claimed in claim 1, wherein said recesses terminate in inner shoulders positioned distant from the exterior surface of said cutter body, said first and second cutting tools having shank portions disposed each in an associated recess and cutting tips situated beyond said exterior surface of said cutter body, each of said tools terminating in inner ends distant from said cutting tips and directed toward the shoulder portion of the associated one of said recesses, set screw means for each of said tools threadedly connected to the inner end of the associated tool and engaging the shoulder portion of the associated recess, so that said set screw means may be turned for adjusting the extent to which said cutting tips of said tools project beyond said exterior surface, and releasable fixing means carried by said cutter body and engaging said tools for releasably fixing the latter in adjusting positions in said recesses.

11. A cutterhead as claimed in claim 10, wherein an axial bore extends through said tools, at least a portion of said bore being threaded for receiving said set screw means, said set screw means having an end portion adapted to be engaged by an adjusting tool and being accessible through said axial bore from the cutting tip end of said tool.

12. A cutterhead as claimed in claim 11, wherein the recesses associated with at least one of said first and second cutting tools are accessible by said adjusting tool from the end thereof containing said shoulder portion for adjusting said set screw means.

13. A cutterhead according to claim 1, wherein said cutter head comprises a third plurality of recesses extending into said body from the exterior surface thereof, a third plurality of cutting tools each having a part received in a respective recess of said third plurality of recesses, and means associated with each one of said third plurality of recesses for adjustment in a predetermined direction of the tool part received therein, the cutting edges of said third plurality of cutting tools being positioned relative to said contour cutting edges to cut a portion of said work piece adjacent said contour cut.

14. A cutterhead according to claim 13, wherein said means associated with each of said third recesses provides adjustment of each of said third plurality of cutting tools along a line describing an angle with respect to the axis of rotation of said cutterhead.

15. A cutterhead according to claim 13, wherein said means associated with each of said third recesses provides adjustment of each of said third plurality of cutting tools along a line parallel to the axis of rotation of said cutterhead.

16. A cutterhead according to claim 13, wherein said first, second, and third pluralities of recesses extend respectively into said body from first, second and third axially spaced peripheral surfaces.

17. A cutterhead according to claim 1, wherein said means associated with each of said second recesses provides adjustment of each of said second plurality of cutting tools along a line perpendicular to the axis of rotation of said cutterhead.

18. A cutterhead according to claim 13, wherein said means associated with each of said third recesses provides adjustment of each of said third plurality of cutting tools along a line perpendicular to the axis of rotation of said cutterhead.

References Cited

UNITED STATES PATENTS

| | | | |
|---|---|---|---|
| 486,269 | 11/1892 | Zimmerman | 144—236 X |
| 561,721 | 6/1896 | Mertz | 144—236 |
| 2,922,448 | 1/1960 | Standal | 144—24 XR |
| 3,268,178 | 8/1966 | Schoeppner | 144—218 X |
| 2,702,059 | 2/1955 | Ballantine | 144—230 |

ANDREW R. JUHASZ, Primary Examiner

G. WEIDENFELD, Assistant Examiner

U.S. Cl. X.R.
144—236